US012058795B1

(12) United States Patent
Song et al.

(10) Patent No.: US 12,058,795 B1
(45) Date of Patent: Aug. 6, 2024

(54) BACKLIGHT CONTROL CIRCUIT, CONTROL METHOD THEREOF AND DISPLAY DEVICE

(71) Applicants: Beijing BOE Optoelectronics Technology Co., Ltd., Beijing (CN); BOE Technology Group Co., Ltd., Beijing (CN)

(72) Inventors: Yifan Song, Beijing (CN); Zhaohui Meng, Beijing (CN); Wenchao Han, Beijing (CN); Wei Sun, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/014,572

(22) PCT Filed: Dec. 27, 2021

(86) PCT No.: PCT/CN2021/141612

§ 371 (c)(1),
(2) Date: Jan. 5, 2023

(87) PCT Pub. No.: WO2023/122879

PCT Pub. Date: Jul. 6, 2023

(51) Int. Cl.
*H05B 47/10* (2020.01)
*G09G 3/20* (2006.01)
*H05B 47/11* (2020.01)

(52) U.S. Cl.
CPC .................................... *H05B 47/11* (2020.01)

(58) Field of Classification Search
CPC ........ H05B 47/10; H05B 47/11; H05B 45/10; H05B 45/32; H05B 45/325; G09G 3/22; G09G 3/30; G09G 5/10
See application file for complete search history.

(56) References Cited

U.S. PATENT DOCUMENTS 11,176,880 B2 * 11/2021 Gu ....................... G09G 3/2022
2010/0013866 A1 1/2010 Okabe
2012/0194493 A1 8/2012 Soto

FOREIGN PATENT DOCUMENTS

CN 101196647 A 6/2008
CN 101622571 A 1/2010
(Continued)

*Primary Examiner* — Jimmy T Vu
(74) *Attorney, Agent, or Firm* — IPro, PLLC

(57) ABSTRACT

In the backlight control circuit; a luminous flux sensing sub-circuit senses luminous flux of a display device, obtains and outputs a first control signal from a first control signal output terminal; a control sub-circuit includes N control units each including a first/second sub-unit; the first sub-unit connects or disconnects an output terminal of the second sub-unit and the backlight control signal output terminal under the control of the first control signal, the second sub-unit connects or disconnects a signal input terminal and the output terminal of the second sub-unit under the control of the second control signal; the N second control signal output terminals provide effective second control signals in a time division manner; conduction thresholds corresponding to the N first sub-units increase sequentially, and when a corresponding relationship between the first control signal and the conduction threshold is met, the first transistor is turned on.

20 Claims, 3 Drawing Sheets

(56) References Cited

FOREIGN PATENT DOCUMENTS

| | | | |
|---|---|---|---|
| CN | 101645231 | A | 2/2010 |
| CN | 102622970 | A | 8/2012 |
| CN | 105453166 | A | 3/2016 |
| CN | 105552226 | A | 5/2016 |
| CN | 105719618 | A | 6/2016 |
| CN | 114038411 | A | 2/2022 |

* cited by examiner

BACKLIGHT CONTROL CIRCUIT, CONTROL METHOD THEREOF AND DISPLAY DEVICE

This application is the U.S. national phase of PCT Application No. PCT/CN2021/141612 filed on Dec. 27, 2021, which is incorporated herein by reference in its entirety.

TECHNICAL FIELD

The present disclosure relates to the field of display technology, in particular to a backlight control circuit, a control method thereof and a display device.

BACKGROUND

With the continuous development of display technology, the application range of display products is becoming wider and wider, and the requirements for user experience of display products are also getting higher and higher. In order to better improve the user experience of the display product, the light in the environment where the display product is applied is sensed, and then the light emitting of the display product is adjusted according to the sensing result, so that when the user watches the image displayed by the display product, a more comfortable visual experience is obtained.

SUMMARY

The object of the present disclosure provides a backlight control circuit, a control method thereof and a display device.

In order to obtain the above object, the following technical solutions is provided.

In a first aspect, an embodiment of the present disclosure provides a backlight control circuit, applied to a display device, wherein the backlight control circuit includes: a luminous flux sensing sub-circuit and a control sub-circuit: the luminous flux sensing sub-circuit is configured to sense luminous flux received by the display device in an environment thereof, obtain a first control signal related to the luminous flux, and output the first control signal from a first control signal output terminal of the luminous flux sensing sub-circuit: the control sub-circuit includes N control units, N is a positive integer greater than or equal to 2, and the control unit includes a first sub-unit and a second sub-unit: the first sub-unit is respectively coupled to the first control signal output terminal, an output terminal of the second sub-unit and a backlight control signal output terminal: the first sub-unit is configured to connect or disconnect the output terminal of the second sub-unit and the backlight control signal output terminal under the control of the first control signal, the second sub-unit is coupled to a corresponding second control signal output terminal and a signal input terminal, and the second sub-unit is configured to connect or disconnect the signal input terminal and the output terminal of the second sub-unit under the control of a second control signal outputted by the corresponding second control signal output terminal: N second control signal output terminals corresponding to the N second sub-units provide effective second control signals in a time division manner; conduction thresholds corresponding to the N first sub-units increase sequentially, and when a corresponding relationship between the first control signal and the conduction threshold of the first sub-unit is met, the first sub-unit is configured to electrically connect the output terminal of the second sub-unit and the backlight control signal output terminal.

Optionally, the first sub-unit includes a first transistor, a gate electrode of the first transistor is coupled to the first control signal output terminal, a first electrode of the first transistor is coupled to the output terminal of the second sub-unit, and a second electrode of the first transistor is coupled to the backlight control signal output terminal.

Optionally, the second sub-unit includes a second transistor, a gate electrode of the second transistor is coupled to the corresponding second control signal output terminal, and a first electrode of the second transistor is connected to the signal input terminal, and a second electrode of the second transistor serves as the output terminal of the second sub-unit.

Optionally, the luminous flux sensing sub-circuit includes: a first photosensitive transistor, a second photosensitive transistor, a subtractor and a light-shielding pattern: the light-shielding pattern shields the second photosensitive transistor: both a gate electrode of the first photosensitive transistor and a gate electrode of the second photosensitive transistor are coupled to the first signal terminal, and a first electrode of the first photosensitive transistor and a first electrode of the second photosensitive transistor both are coupled to the second signal terminal, a second electrode of the first photosensitive transistor is coupled to a first input terminal of the subtractor, and a second electrode of the second photosensitive transistor is coupled to a second input terminal of the subtractor, and an output terminal of the subtractor is coupled to the first control signal output terminal.

Optionally, the subtractor includes: a first operational amplifier, a first resistance unit and a second resistance unit: a first input terminal of the first operational amplifier is coupled to the second electrode of the first photosensitive transistor, and a second input terminal of the first operational amplifier is coupled to the second electrode of the second photosensitive transistor, an output terminal of the first operational amplifier is coupled to the first control signal output terminal: a first terminal of the first resistance unit is coupled to the first input terminal of the first operational amplifier, and a second terminal of the first resistance unit is connected to a ground signal: a first terminal of the second resistance unit is coupled to the second input terminal of the first operational amplifier, and a second terminal of the second resistance unit is connected to the ground signal.

Optionally, the luminous flux sensing sub-circuit further includes an integrator: a first input terminal of the integrator is coupled to an output terminal of the subtractor, a second terminal of the integrator is connected to a ground signal, and an output terminal of the integrator is coupled to the first control signal output terminal.

Optionally, the integrator includes: a second operational amplifier, a third resistance unit, a fourth resistance unit and a capacitance unit: a first terminal of the third resistance unit is coupled to the output terminal of the subtractor, and a second terminal of the third resistance unit is coupled to the first input terminal of the second operational amplifier: a first terminal of the fourth resistance unit is connected to the ground signal, and a second terminal of the fourth resistance unit is coupled to the second input terminal of the second operational amplifier: a first terminal of the capacitor unit is coupled to the first input terminal of the second operational amplifier, and a second terminal of the capacitor unit is coupled to the output terminal of the second operational amplifier: the output terminal of the second operational amplifier is coupled to the first control signal output terminal.

Optionally, the luminous flux sensing sub-circuit further includes: a control reset unit, wherein the control reset unit is respectively coupled to a third signal terminal, the first terminal of the capacitance unit and the second terminal of the capacitance unit, and the control reset unit is configured to control to connect or disconnect the first terminal of the capacitance unit and the second terminal of the capacitance unit under the control of a signal inputted by the third signal terminal.

Optionally, the luminous flux sensing sub-circuit further includes: an inverting operational amplifier, wherein a non-inverting input terminal of the inverting operational amplifier is connected to the ground signal, an inverting input terminal of the inverting operational amplifier is coupled to the output terminal of the integrator, an output terminal of the inverting operational amplifier is coupled to the first control signal output terminal.

A second aspect of the present disclosure provides a control method of a backlight control circuit, applied to the backlight control circuit, the backlight control circuit includes: a luminous flux sensing sub-circuit and a control sub-circuit, and the control method includes: in an obtaining phase, sensing, by the luminous flux sensing sub-circuit, the luminous flux received by the display device in the environment thereof, obtaining the first control signal related to the luminous flux, and outputting the first control signal from the first control signal output terminal of the luminous flux sensing sub-circuit: providing, by the N second control signal output terminals corresponding to the N second sub-units, effective second control signals in a time division manner, and the effective second control signal being used to control a corresponding second sub-unit to connect the signal input terminal and the output terminal of the second sub-unit: when the corresponding relationship between the first control signal and the conduction threshold of the first sub-unit is met, connecting, by the first sub-unit, the output terminal of the second sub-unit and the backlight control signal output terminal.

Optionally, the first sub-unit includes a first transistor, the second sub-unit includes a second transistor, and a gate electrode of the first transistor is coupled to the first control signal output terminal, a first electrode of the first transistor is coupled to a second electrode of the second transistor, and a second electrode of the first transistor is coupled to the backlight control signal output terminal: a gate electrode of the second transistor is coupled to the corresponding second control signal output terminal, and a first electrode of the second transistor is coupled to the signal input terminal: in the obtaining phase, the effective second control signal being used to control the corresponding second transistor to be turned on: when the corresponding relationship between the first control signal and the conduction threshold of the first transistor is met, the first transistor being turned on.

A third aspect of the present disclosure provides a display device, including the backlight control circuit, wherein the display device further comprises: a backlight driving circuit and a backlight source coupled to each other: wherein the backlight driving circuit is further coupled to a backlight control signal output terminal, and the backlight driving circuit is configured to output a backlight driving signal to the backlight source under the control of a backlight control signal outputted by the backlight control signal output terminal.

BRIEF DESCRIPTION OF THE DRAWINGS

The drawings described here are used to provide a further understanding of the present disclosure, and constitute a part of the present disclosure. The embodiments of the present disclosure and the description are used to explain the present disclosure, and do not constitute improper limitations to the present disclosure.

DETAILED DESCRIPTION

In order to further illustrate the backlight control circuit, the control method thereof, and the display device provided by the embodiments of the present disclosure, a detailed description will be given below in conjunction with the accompanying drawings.

In related art, when a display product changes the light emitting power of the backlight by sensing the magnitude of the ambient luminous flux, and then realizes the brightness adjustment of the module, the general architecture is to use ambient light sensor (ALS) three-in-one light-sensing chip to transmit the luminous flux information to the motherboard platform, and sends backlight control signals to the backlight driving circuit (such as: LED Driver) through the motherboard platform, thereby changing the brightness of the backlight.

The following problems exist when adopting the above-mentioned structure:

It is necessary to carry out digital circuit logic operations by digital circuit devices on the motherboard platform to convert light-sensing signals into LEDPWM signals for controlling the backlight, which is not only costly but also consumes a lot of power.

Figure 1:
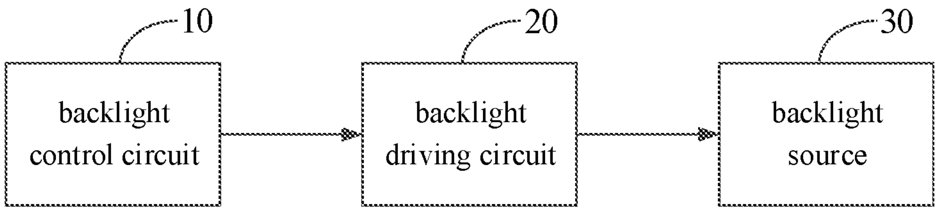
FIG. 1 is a schematic diagram of a backlight control circuit for controlling a backlight source according to an embodiment of the present disclosure.
Figure 2:
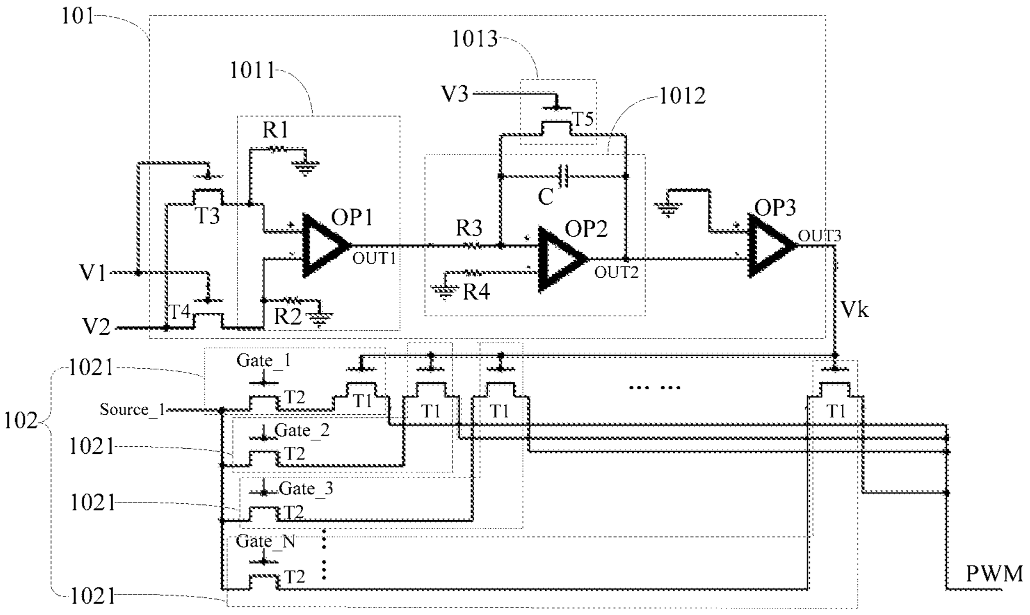
FIG. 2 is a circuit diagram of a backlight control circuit according to an embodiment of the present disclosure.
Figure 3:
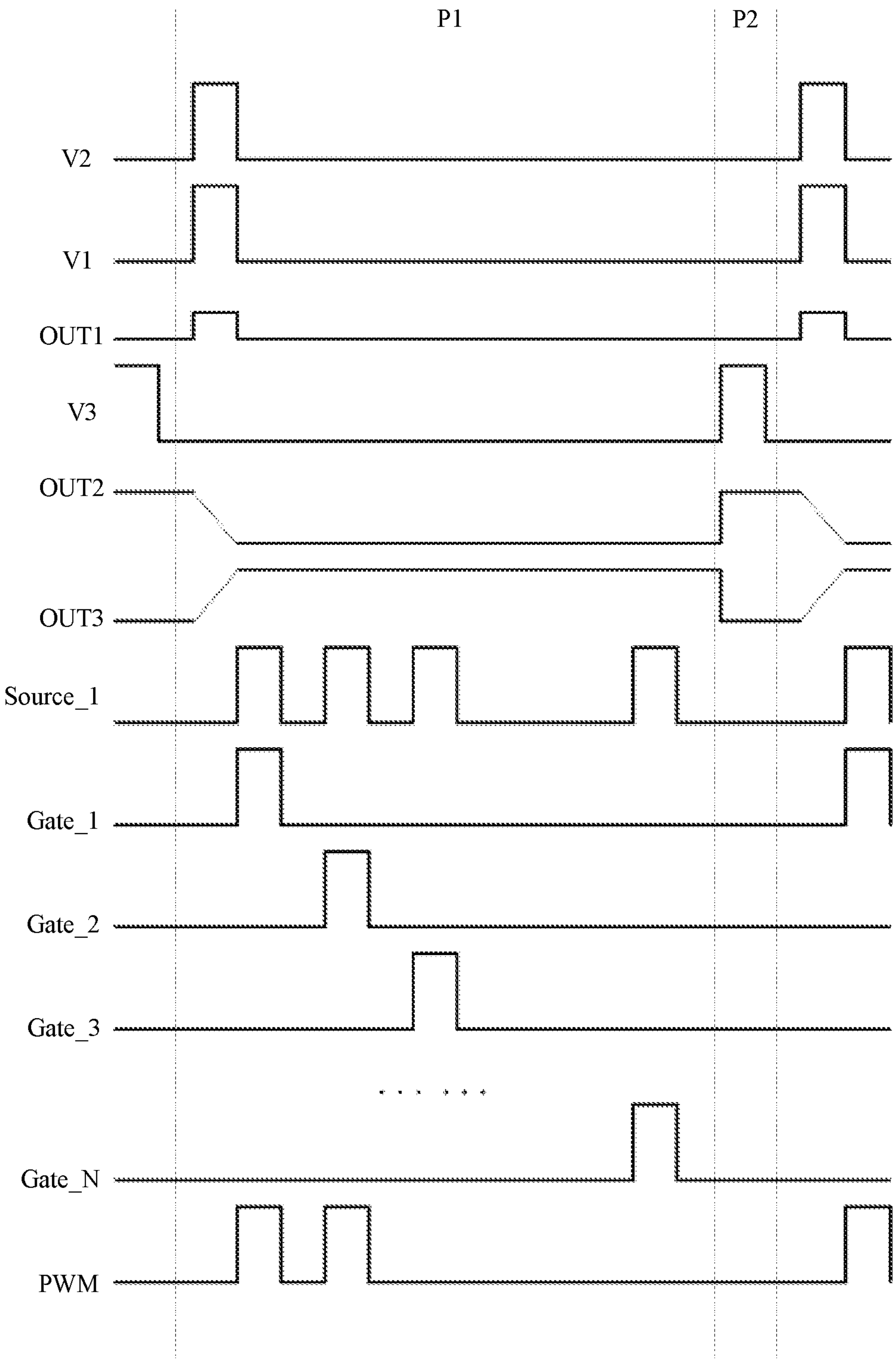
FIG. 3 is a timing sequence diagram of a backlight control circuit according to an embodiment of the present disclosure.

Referring to FIG. 1 to FIG. 3, an embodiment of the present disclosure provides a backlight control circuit 10, which is applied to a display device, and the backlight control circuit 10 includes: a luminous flux sensing sub-circuit 101 and a control sub-circuit 102:

The luminous flux sensing sub-circuit 101 is configured to sense the luminous flux received by the display device in the environment thereof, obtain a first control signal related to the luminous flux, and output the first control signal from the first control signal output terminal Vk of the luminous flux sensing sub-circuit 101;

The control sub-circuit 102 includes N control units 1021, where N is a positive integer greater than or equal to 2, and the control unit 1021 includes a first sub-unit (such as a first transistor T1) and a second sub-unit (such as a second transistor T2); the first sub-unit is respectively coupled to the first control signal output terminal Vk, the output terminal of the second sub-unit and the backlight control signal output terminal PWM; the first sub-unit is configured to connect or disconnect the output terminal of the second sub-unit and the backlight control signal output terminal PWM under the control of the first control signal, the second sub-unit is coupled to the corresponding second control signal output terminal and the signal input terminal, and the second sub-unit is configured to connect or disconnect the signal input terminal (input signal Source_1) and the output terminal of the second sub-unit under the control of the second control signal (such as: Gate_1 to Gate_N) outputted by the corresponding second control signal output terminal.

The N second control signal output terminals corresponding to the N second sub-units provide effective second control signals in a time division manner; the conduction thresholds corresponding to the N first sub-units increase sequentially, and when the corresponding relationship between the first control signal and the conduction threshold of the first sub-unit is met, the first sub-unit is configured to electrically connect the output terminal of the second sub-unit and the backlight control signal output terminal PWM.

Exemplarily, the display device includes a display panel and a main board connected to the display panel, and the main board includes a flexible circuit board or a printed circuit board. The luminous flux sensing sub-circuit 101 is arranged on the main board for sensing the luminous flux received by the display panel in its environment.

Exemplarily, the first control signal is positively correlated with the luminous flux received by the display device in its environment.

Exemplarily, among the N control units 1021, the first sub-unit included in each control unit 1021 are coupled to the first control signal output terminal Vk, and is controlled by the first control signal. When the corresponding relationship between the first control signal and the conduction threshold of the first sub-unit is met, the first sub-unit connects the output terminal of the second sub-unit and the backlight control signal output terminal PWM.

Exemplarily, the N second control signal output terminals corresponding to the N second sub-units provide effective second control signals in a time division manner, and can control the N second sub-units to connect the signal input terminal and the output terminal of the second sub-unit in a time division manner.

Exemplarily, when the corresponding relationship between the first control signal and the conduction threshold of the first sub-unit is met, the first sub-unit connects the output terminal of the second sub-unit and the backlight control signal output terminals PWM. When the corresponding relationship between the first control signal and the conduction threshold of the first sub-unit is not met, the first sub-unit disconnects the output terminal of the second sub-unit from the backlight control signal output terminal PWM.

Exemplarily, when the first sub-unit connects the output terminal of the second sub-unit and the backlight control signal output terminal PWM, the second sub-unit 1021 belonging to the same control unit as the first sub-unit is connected, the signal input terminal can be electrically connected to the backlight control signal output terminal PWM through the second sub-unit and the first sub-unit, so that the backlight control signal output terminal PWM outputs an effective level signal to increase the duty ratio of the backlight control signal outputted by the backlight control signal output terminal PWM.

According to the specific structure of the above-mentioned backlight control circuit 10, in the backlight control circuit 10 provided by the embodiment of the present disclosure, the luminous flux sensing sub-circuit 101 is provided, and the luminous flux sensing sub-circuit 101 can sense the luminous flux received by the display device in the environment thereof, and can output the first control signal related to the luminous flux from the first control signal output terminal Vk of the luminous flux sensing sub-circuit 101.

In the backlight control circuit 10 provided by the embodiment of the present disclosure, N control units 1021 are provided, and each control unit 1021 includes a first sub-unit and a second sub-unit: N second control signal output terminals coupled to N second sub-units included in the N control units 1021 provide effective second control signals in a time division manner, and when the second control signal output terminal coupled to the second sub-circuit provides an effective second control signal, the second sub-unit connects the signal input terminal and the output terminal of the second sub-unit: the conduction thresholds corresponding to the N first sub-units included in the N control units 1021 increase sequentially, and when the corresponding relationship between the first control signal and the conduction threshold of the first sub-unit is met, the first sub-unit connects the output terminal of the second sub-unit and the backlight control signal output terminal PWM.

In the backlight control circuit 10 provided by the embodiment of the present disclosure, the first control signal is related to the luminous flux, and when the corresponding relationship between the first control signal and the conduction thresholds of more first sub-units is met, then the more first sub-units will be turned on, and when the corresponding relationship between the first control signal and the conduction thresholds of fewer first sub-units is met, fewer first sub-units will be turned on. Therefore, the number of the first sub-units that are turned on is different depending on the luminous flux received by the display panel. At the same time, by setting the N second sub-units to be turned on in a time division manner, the control unit 1021 corresponding to the first sub-unit that is turned on can control to connect the signal input terminal and the backlight control signal output terminal PWM in a time division manner, so as to change the duty ratio of the backlight control signal outputted by the backlight control signal output terminal PWM. The higher the duty ratio of the backlight control signal is, the greater the output power of the backlight source 30 is, and the higher the brightness of the display panel is.

It should be noted that the first sub-unit is turned on, that is, under the control of the first control signal, the first sub-unit electrically connects the output terminal of the second sub-unit and the backlight control signal output terminal PWM. The second sub-unit is turned on, that is, the second sub-unit electrically connects the signal input terminal and the output terminal of the second sub-unit under the control of the corresponding second control signal.

Therefore, in the backlight control circuit 10 provided by the embodiment of the present disclosure, the backlight control circuit 10 includes the luminous flux sensing sub-circuit 101 and the control sub-circuit 102, the corresponding relationship between the luminous flux and the backlight control signal is established, the backlight can be directly controlled according to the luminous flux, and the light-sensing signal can be converted into a backlight control signal for controlling the backlight without requiring digital circuit devices on the motherboard to perform digital circuit logic operations, which not only effectively reduces the cost, but also reduces the power consumption of the motherboard.

As shown in FIG. 2 and FIG. 3, in some embodiments, the first sub-unit includes a first transistor T1, the gate electrode of the first transistor T1 is coupled to the first control signal output terminal Vk, the first electrode of the first transistor T1 is coupled to the output terminal of the second sub-unit, and the second electrode of the first transistor T1 is coupled to the backlight control signal output terminal PWM.

Exemplarily, the conduction thresholds (e.g., threshold voltages) corresponding to the N first transistors T1 included in the N first sub-units increase sequentially. In an obtaining phase P1, when the corresponding relationship between the first control signal and the conduction threshold of the first transistor T1 is met, the first transistor T1 is turned on.

In some embodiments, the second sub-unit includes a second transistor T2, the gate electrode of the second transistor T2 is coupled to the corresponding second control signal output terminal, and the first electrode of the second transistor T2 is connected to the signal input terminal, and the second electrode of the second transistor T2 serves as the output terminal of the second sub-unit.

Exemplarily, the effective second control signal controls the corresponding second transistor T2 to be turned on. When the second transistor T2 includes an NMOS transistor, the effective second control signal, that is, the second control signal is at a high level. When the second transistor T2 includes a PMOS transistor, the effective second control signal, that is, the second control signal is at a low level.

As shown in FIG. 2 and FIG. 3, in more detail, the first transistor T1 and the second transistor T2 both include NMOS transistors as an example. The first control signal is connected to the gate electrodes of the first transistors T1 with different threshold voltages. The second control signals connected to the gate electrodes of the N second transistors T2 are Gate_1, Gate_2, Gate_3 to Gate_N. When the timing of the signal Source_1 and Gate_1, Gate_2, Gate_3 to Gate_N inputted by the signal input terminal is shown in FIG. 3, the second transistors T2 are turned on sequentially to transmit the signal Source_1 to the first transistors T1. The threshold voltages of the N first transistors T1 gradually increase. When the first control signal is at a fixed potential, only the first transistors T1 whose threshold voltage is lower than the fixed potential are turned on, and the other first transistors T1 are all turned off. FIG. 3 illustrates that only the two first transistors T1 are turned on.

It should be noted that as the potential of the first control signal increases, the number of first transistors T1 that can be turned on increases, so the duty cycle of the backlight control signal is positively correlated with the first control signal, that is, the duty cycle of the high potential of the backlight control signal is positively related to the luminous flux received by the display panel. The higher the duty cycle of the high potential of the backlight control signal is, the higher the output power of the backlight source 30 is, and the higher the brightness of the display panel is.

As shown in FIG. 2, in some embodiments, the luminous flux sensing sub-circuit 101 includes: a first photosensitive transistor T3, a second photosensitive transistor T4, a subtractor 1011 and a light-shielding pattern:

The light-shielding pattern shields the second photosensitive transistor T4;

Both the gate electrode of the first photosensitive transistor T3 and the gate electrode of the second photosensitive transistor T4 are coupled to the first signal terminal V1, and the first electrode of the first photosensitive transistor T3 and the first electrode of the second photosensitive transistor T4 both are coupled to the second signal terminal V2, the second electrode of the first photosensitive transistor T3 are coupled to the first input terminal of the subtractor 1011, and the second electrode of the second photosensitive transistor T4 is coupled to the second input terminal of the subtractor 1011, and the output terminal OUT1 of the subtractor 1011 is coupled to the first control signal output terminal Vk.

Exemplarily, the characteristics of the first photosensitive transistor T3 and the second photosensitive transistor T4 are the same.

Exemplarily, the subtracter 1011 is configured to subtract the signals inputted from the first input terminal and the second input terminal, and then output the result.

As shown in FIG. 2, the first signal terminal V1 inputs a first signal, and the second signal terminal V2 inputs a second signal. When the display panel is in a 0 lux dark state environment, the first photosensitive transistor T3 and the second photosensitive transistor T4 have the same electrical characteristics, and the electrical signals outputted by the first photosensitive transistor T3 and the second photosensitive transistor T4 are consistent. In this case, the output potential of the output terminal of the subtractor 1011 is 0. When the display panel is in a lighting environment with a certain brightness, the electrical characteristics of the first photosensitive transistor T3 change, the potential of the electrical signal outputted by the first photosensitive transistor T3 is higher than the potential of the electrical signal outputted by the second photosensitive transistor T4, and the output terminal of the subtractor 1011 outputs the signal after the subtraction operation, and the signal is positively correlated with the luminous flux.

The above described luminous flux sensing sub-circuit 101 includes: a first photosensitive transistor T3, a second photosensitive transistor T4, a subtractor 1011 and a light-shielding pattern, so that the output terminal of the subtractor 1011 can output a signal positively correlated with the luminous flux, so the signal outputted by the output terminal of the subtracter 1011 may be directly used as the first control signal.

As shown in FIG. 2 and FIG. 3, in some embodiments, the subtractor 1011 includes: a first operational amplifier OP1, a first resistance unit R1 and a second resistance unit R2:

The first input terminal of the first operational amplifier OP1 is coupled to the second electrode of the first photosensitive transistor T3, and the second input terminal of the first operational amplifier OP1 is coupled to the second electrode of the second photosensitive transistor T4, the output terminal of the first operational amplifier OP1 is coupled to the first control signal output terminal Vk.

A first terminal of the first resistance unit R1 is coupled to the first input terminal of the first operational amplifier OP1, and a second terminal of the first resistance unit R1 is connected to a ground signal:

A first terminal of the second resistance unit R2 is coupled to a second input terminal of the first operational amplifier OP1, and a second terminal of the second resistance unit R2 is connected to the ground signal.

Exemplarily, the first input terminal of the first operational amplifier OP1 includes a non-inverting input terminal, and the second input terminal of the first operational amplifier OP1 includes an inverting input terminal.

Exemplarily, the resistance values of the first resistance unit R1 and the second electronic unit are equal.

As shown in FIG. 2 and FIG. 3, in some embodiments, the luminous flux sensing sub-circuit 101 further includes an integrator 1012; the first input terminal of the integrator 1012 is coupled to the output terminal of the subtractor 1011, the second terminal of the integrator 1012 is connected to a ground signal, and the output terminal OUT2 of the integrator 1012 is coupled to the first control signal output terminal Vk.

Exemplarily, the first input terminal of the integrator 1012 is used as a non-inverting input terminal, and the second input terminal of the integrator 1012 is used as an inverting input terminal.

Exemplarily, the signal outputted by the output terminal of the integrator 1012 may be directly used as the first control signal.

The luminous flux sensing sub-circuit 101 also includes an integrator 1012, so that the integrator 1012 can accumulate the charge of the electrical signal outputted by the subtractor 1011, and the signal finally outputted by the integrator 1012 can be used as the first control signal, which is beneficial to improve the sensing accuracy.

As shown in FIG. 2 and FIG. 3, in some embodiments, the integrator 1012 includes: a second operational amplifier OP2, a third resistance unit R3, a fourth resistance unit R4 and a capacitance unit C;

The first terminal of the third resistance unit R3 is coupled to the output terminal of the subtractor 1011, and the second terminal of the third resistance unit R3 is coupled to the first input terminal of the second operational amplifier OP2;

The first terminal of the fourth resistance unit R4 is connected to a ground signal, and the second terminal of the fourth resistance unit R4 is coupled to the second input terminal of the second operational amplifier OP2;

The first terminal of the capacitor unit C is coupled to the first input terminal of the second operational amplifier OP2, and the second terminal of the capacitor unit C is coupled to the output terminal of the second operational amplifier OP2;

The output terminal of the second operational amplifier OP2 is coupled to the first control signal output terminal Vk.

Exemplarily, the resistance values of the third resistance unit R3 and the fourth resistance unit R4 are equal.

Exemplarily, the current flowing through the third resistance unit R3 is equal to the current charging the capacitor unit C, and based on the virtual short principle of the operational amplifier, the potential of the second terminal of the third resistance unit R3 is equal to GND (i.e., ground signal). The potential of the signal outputted by the first operational amplifier OP1 is Vout1, the potential of the signal outputted by the second operational amplifier OP2 is Vout2, and the current passing through the third resistance unit R3 is I1=Vout1/R3. In the formula, R3 represents the resistance value of the third resistance unit R3; according to the definition of capacitance C=Q/U and the definition of current I=dQ/dt, the current for charging the capacitor unit C is I2=C×d(0−Vout2)/dt; C in the formula represents the capacitance value of the capacitor unit C, Q represents the amount of charge accumulated by the capacitor unit C, and U represents the voltage applied on the two electrode plates of the capacitor unit C.

According to I1=I2, the solution is:

$$V\mathrm{out2} = -\int (V\mathrm{out1})dt/(C \times R3),$$

As shown in FIG. 3, when the subtractor 1011 stops outputting a high potential, the integrator 1012 stops charging the capacitor unit C, and the potential of the output terminal of the second operational amplifier OP2 remains stable until the reset phase P2.

As shown in FIG. 2 and FIG. 3, in some embodiments, the luminous flux sensing sub-circuit 101 further includes:

A control reset unit 1013, wherein the control reset unit 1013 is respectively coupled to the third signal terminal V3, the first terminal of the capacitance unit C and the second terminal of the capacitance unit C, and the control reset unit 1013 is configured to control to connect or disconnect the first terminal of the capacitance unit C and the second terminal of the capacitance unit C under the control of the signal inputted by the third signal terminal V3.

Exemplarily, the control reset unit 1013 includes a control transistor T5, the gate electrode of the control transistor T5 is coupled to the third signal line, and the first electrode of the control transistor T5 is connected to the first terminal of the capacitor unit C, and the second terminal of the control transistor T5 is coupled to the second terminal of the capacitor unit C. The control transistor T5 is turned on or off under the control of the third signal inputted by the third signal line.

Exemplarily, the control transistor T5 includes an NMOS transistor.

Exemplarily, in the obtaining phase P1, the control reset unit 1013 controls to disconnect the first terminal of the capacitor unit C and the second terminal of the capacitor unit C under the control of the signal inputted by the third signal terminal V3. In the reset phase P2, the control reset unit 1013 controls to connect the first terminal of the capacitor unit C and the second terminal of the capacitor unit C under the control of the signal inputted by the third signal terminal V3.

The luminous flux sensing sub-circuit 101 also includes a control reset unit 1013, so that the control reset unit can discharge and reset the capacitor unit C in the reset phase P2, and wait for the start of the sampling of the next frame.

As shown in FIG. 2 and FIG. 3, in some embodiments, the luminous flux sensing sub-circuit 101 further includes:

An inverting operational amplifier OP3, the non-inverting input terminal of the inverting operational amplifier OP3 is connected to a ground signal, the inverting input terminal of the inverting operational amplifier OP3 is coupled to the output terminal of the integrator 1012, the output terminal OUT3 of the inverting operational amplifier OP3 is coupled to the first control signal output terminal Vk.

The potential signal of the output terminal of the inverting operational amplifier OP3 is:

$$V\mathrm{out3} = -\int (V\mathrm{out1})dt/(C \times R3),$$

In the above configuration, the luminous flux sensing sub-circuit 101 further includes an inverting operational amplifier OP3, capable of controlling the potential of the first control signal to be a positive value.

Figure 4:
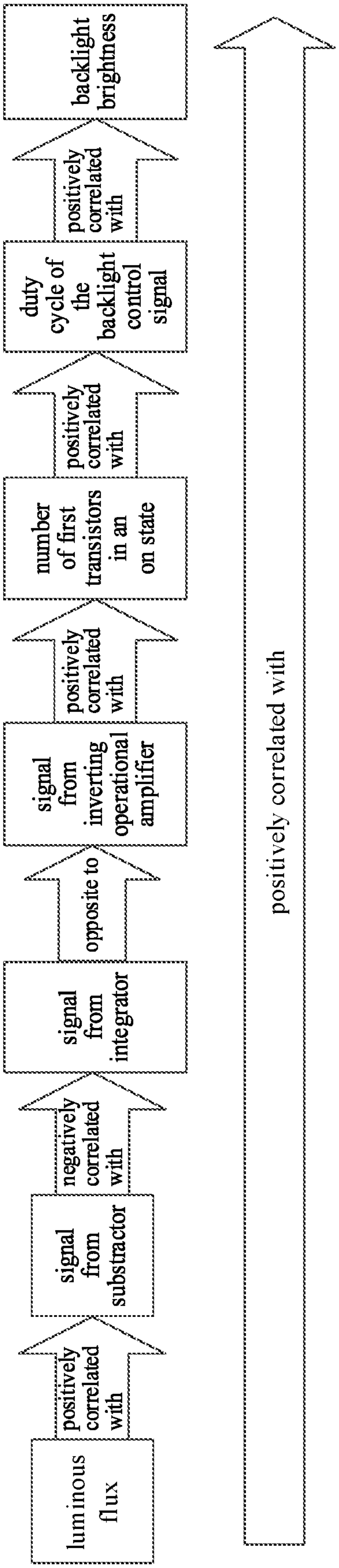
FIG. 4 is a schematic diagram of the relationship between the luminous flux and the backlight brightness according to the embodiment of the present disclosure.

As shown in FIG. 4, for example, the luminous flux is positively correlated with the signal outputted by the subtractor 1011, the signal outputted by the subtractor 1011 is negatively correlated with the signal outputted by the integrator 1012, and the signal outputted by the integrator 1012 is opposite to the signal outputted by the inverting operational amplifier OP3, the signal outputted by the inverting operational amplifier OP3 is positively correlated with the number of the first transistors T1 that are turned on, the number of the first transistors T1 that are turned on is positively correlated with the duty cycle of the backlight control signal, and the duty cycle of the backlight control signal is positively correlated with the backlight brightness.

Exemplarily, N is equal to 1000, the adjustment range of the backlight brightness is between 100 nit-10000 nit, the potential range of the signals outputted by the inverting operational amplifier OP3 is between 200 mV-1.2V, and the range of the threshold voltage of the first transistor T1 is between 200 mV-1200 mV: the threshold voltages of N first transistors T1 gradually increase, and the threshold voltages of adjacent first transistors T1 differ by 1 mV. When the first first transistor T1 is turned on, the corresponding increase in brightness is 100 nit, each time one first transistor is turned on, the corresponding increase in brightness is 9.9 nit. Exemplarily, the voltage value corresponding to the first control signal is 500 mV, the number of the first transistors T1 that are turned on is 301, and the output brightness of the backlight source 30 is controlled to be 2970 nit.

In the backlight control circuit 10 provided by the above embodiment, when the luminous flux of the display panel changes, the electrical signal difference between the first photosensitive transistor T3 and the second photosensitive transistor T4 changes in a positive correlation, thus causing the signals outputted by the operational amplifiers to change. By setting triodes with different turn-on voltages, the potential of the first control signal is positively correlated with the number of triodes that can be turned on, so as to ensure through a specific timing sequence that the higher the signal potential is, the larger the duty cycle of the high potential of the backlight control signal outputted in one cycle is, so as to realize the direct monotonic mapping from the luminous flux to the backlight control signal without the logic operation of the digital circuit.

The embodiment of the present disclosure also provides a control method of the backlight control circuit 10, which is applied to the backlight control circuit 10 provided in the above embodiment, and the backlight control circuit 10 includes: a luminous flux sensing sub-circuit 101 and a control sub-circuit 102; the control methods includes:

In the obtaining phase P1, the luminous flux sensing sub-circuit 101 senses the luminous flux received by the display device in its environment, obtains a first control signal related to the luminous flux, and outputs the first control signal from the first control signal output terminal Vk of the luminous flux sensing sub-circuit 101: the N second control signal output terminals corresponding to the N second sub-units provide effective second control signals in a time division manner, and the effective second control signal is used to control the corresponding second sub-unit to connect the signal input terminal and the output terminal of the second sub-unit: when the corresponding relationship between the first control signal and the conduction threshold of the first sub-unit is met, the first sub-unit connects the output terminal of the second sub-unit and the backlight control signal output terminal PWM.

Exemplarily, one cycle includes an obtaining phase P1 and a reset phase P2.

In the backlight control circuit 10 provided in the above-mentioned embodiment, N control units 1021 are provided, and each control unit 1021 includes a first sub-unit and a second sub-unit: the N second control signal output terminals coupled to the N second sub-units included in the N control units 1021 provide effective second control signals in a time division manner, and when the second control signal output terminal connected to the second sub-unit provide effective second control signal, the second sub-unit electrically connects the signal input terminal and the output terminal of the second sub-unit: the conduction thresholds corresponding to the N first sub-units included in the N control units 1021 increase sequentially, and when the corresponding relationship between first control signal and the conduction thresholds of the first sub-unit is met, the first sub-unit electrically connects the output terminal of the second sub-unit and the backlight control signal output terminal PWM.

In the backlight control circuit 10 provided in the above embodiment, the first control signal is related to the luminous flux, and when the corresponding relationship between the first control signal and the conduction thresholds of more first sub-units is met, the more first sub-units are turned on, and when the corresponding relationship between the first control signal and the conduction thresholds of fewer first sub-units is met, fewer first sub-units will be turned on, therefore, the number of the first sub-units that are turned on is different when the luminous flux received by the display panel is different. At the same time, the N second sub-units are turned on in a time division manner, the control unit 1021 corresponding to the first sub-unit that is turned on can control to connect the signal input terminal and the backlight control signal output terminal PWM in a time division manner, to change the duty cycle of the backlight control signal outputted by the backlight control signal output terminal PWM. The higher the duty cycle of the backlight control signal is, the greater the output power of the backlight source 30 is, and the higher the brightness of the display panel is.

Therefore, when the backlight control circuit 10 is controlled by the control method provided by the embodiment of the present disclosure, the corresponding relationship between the luminous flux and the backlight control signal is established, and the backlight can be directly controlled according to the luminous flux without performing digital circuit logic operations by the digital circuit devices on the main board, the photosensitive signal can be converted into a backlight control signal for controlling the backlight, which not only effectively reduces the cost, but also reduces the power consumption of the main board.

In some embodiments, the first sub-unit includes a first transistor T1, the second sub-unit includes a second transistor T2, and the gate electrode of the first transistor T1 is coupled to the first control signal output terminal Vk, the first electrode of the first transistor T1 is coupled to the second electrode of the second transistor T2, and the second electrode of the first transistor T1 is coupled to the backlight control signal output terminal PWM: the gate electrode of the second transistor T2 is coupled to the corresponding second control signal output terminal, and the first electrode of the second transistor T2 is coupled to the signal input terminal:

In the obtaining phase P1, the effective second control signal is used to control the corresponding second transistor T2 to be turned on; when the corresponding relationship between the first control signal and the conduction threshold of the first transistor T1 is met, the first transistor T1 is turned on.

In the reset phase P2, the second control signal is used to control the corresponding second transistor T2 to be turned off; the corresponding relationship between the first control signal and the conduction threshold of the first transistor T1 is met, and the first transistor T1 is turned off.

As shown in FIG. 1 and FIG. 2, an embodiment of the present disclosure also provides a display device, including the backlight control circuit 10 provided in the above embodiment, and the display device further includes: a backlight driving circuit 20 and a backlight source 30 coupled to each other. The backlight driving circuit 20 is also coupled to the backlight control signal output terminal PWM, and the backlight driving circuit 20 is configured to output the backlight driving signal to the backlight source 30 under the control of the backlight control signal outputted by the backlight control signal output terminal PWM.

Exemplarily, the display device further includes a display panel, the backlight control circuit 10 is arranged on a flexible circuit board or a printed circuit board, and the flexible circuit board or the printed circuit board is connected to the display panel.

Exemplarily, the backlight control circuit 10 outputs a backlight control signal to the backlight driving circuit 20, and the backlight driving circuit 20 is configured to output a corresponding backlight signal to the backlight source 30 under the control of the backlight control signal, the backlight source 30 realizes corresponding backlight brightness according to the backlight driving signal.

It should be noted that the display device can be any product or component with a display function such as a TV, a monitor, a digital photo frame, a mobile phone, a tablet computer, etc., wherein the display device also includes a flexible circuit board, a printed circuit board and a back plate etc.

The display device provided by the embodiment of the present disclosure uses the backlight control circuit integrated on the display panel to directly output the backlight control signal, which saves the ALS photosensitive chip and the digital circuit device used for logic calculation, thus saving the power consumption and cost caused by these devices, and at the same time, the functional requirements for changing the brightness of the module according to the ambient luminous flux.

In each method embodiment of the present disclosure, the serial numbers of the steps cannot be used to limit the order of the steps. For those of ordinary skill in the art, the order of the steps can be changed without creative work, which is also within the protection scope of the present disclosure.

It should be noted that each embodiment in this specification is described in a progressive manner, the same and similar parts of each embodiment can be referred to each other, and each embodiment focuses on the differences from other embodiments. In particular, for the method embodiments, since they are basically similar to the product embodiments, the description is relatively simple, and for relevant parts, the part of the description of the product embodiments may be referred.

Unless otherwise defined, the technical terms or scientific terms used in the present disclosure shall have the usual meanings understood by those skilled in the art to which the present disclosure belongs. "First", "second" and similar words used in the present disclosure do not indicate any order, quantity or importance, but are only used to distinguish different components. "Comprising" or "including" and similar words mean that the elements or items appearing before the word include the elements or items listed after the word and their equivalents, without excluding other elements or items. Words such as "connected", "coupled" are not limited to physical or mechanical connections, but may include electrical connections, whether direct or indirect. "Up", "Down", "Left", "Right" and so on are only used to indicate the relative positional relationship. When the absolute position of the described object changes, the relative positional relationship may also change accordingly.

It should be appreciated that, in the case that such an element as layer, film, region or substrate is arranged "on" or "under" another element, it may be directly arranged "on" or "under" the other element, or an intermediate element may be arranged therebetween.

In the above description, the features, structures, materials or characteristics may be combined in any embodiment or embodiments in an appropriate manner.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A backlight control circuit applied to a display device, wherein the backlight control circuit comprises: a luminous flux sensing sub-circuit and a control sub-circuit;

the luminous flux sensing sub-circuit is configured to sense luminous flux received by the display device in an environment thereof, obtain a first control signal related to the luminous flux, and output the first control signal from a first control signal output terminal of the luminous flux sensing sub-circuit;

the control sub-circuit includes N control units, N is a positive integer greater than or equal to 2, and the control unit includes a first sub-unit and a second sub-unit; the first sub-unit is respectively coupled to the first control signal output terminal, an output terminal of the second sub-unit and a backlight control signal output terminal; the first sub-unit is configured to connect or disconnect the output terminal of the second sub-unit and the backlight control signal output terminal under the control of the first control signal, the second sub-unit is coupled to a corresponding second control signal output terminal and a signal input terminal, and the second sub-unit is configured to connect or disconnect the signal input terminal and the output terminal of the second sub-unit under the control of a second control signal outputted by the corresponding second control signal output terminal;

N second control signal output terminals corresponding to the N second sub-units provide effective second control signals in a time division manner; conduction thresholds corresponding to the N first sub-units increase sequentially, and when a corresponding relationship between the first control signal and the conduction threshold of the first sub-unit is met, the first sub-unit is configured to electrically connect the output terminal of the second sub-unit and the backlight control signal output terminal.

2. The backlight control circuit according to claim 1, wherein, the first sub-unit includes a first transistor, a gate electrode of the first transistor is coupled to the first control signal output terminal, a first electrode of the first transistor is coupled to the output terminal of the second sub-unit, and a second electrode of the first transistor is coupled to the backlight control signal output terminal.

3. The backlight control circuit according to claim 1, wherein, the second sub-unit includes a second transistor, a gate electrode of the second transistor is coupled to the corresponding second control signal output terminal, and a first electrode of the second transistor is connected to the signal input terminal, and a second electrode of the second transistor serves as the output terminal of the second sub-unit.

4. The backlight control circuit according to claim 1, wherein the luminous flux sensing sub-circuit includes: a first photosensitive transistor, a second photosensitive transistor, a subtractor and a light-shielding pattern;

the light-shielding pattern shields the second photosensitive transistor;

both a gate electrode of the first photosensitive transistor and a gate electrode of the second photosensitive transistor are coupled to the first signal terminal, and a first electrode of the first photosensitive transistor and a first electrode of the second photosensitive transistor both are coupled to the second signal terminal, a second electrode of the first photosensitive transistor is coupled to a first input terminal of the subtractor, and a second electrode of the second photosensitive transistor is coupled to a second input terminal of the subtractor, and an output terminal of the subtractor is coupled to the first control signal output terminal.

5. The backlight control circuit according to claim 4, wherein the subtractor includes: a first operational amplifier, a first resistance unit and a second resistance unit;

a first input terminal of the first operational amplifier is coupled to the second electrode of the first photosensitive transistor, and a second input terminal of the first operational amplifier is coupled to the second electrode of the second photosensitive transistor, an output terminal of the first operational amplifier is coupled to the first control signal output terminal;

a first terminal of the first resistance unit is coupled to the first input terminal of the first operational amplifier, and a second terminal of the first resistance unit is connected to a ground signal;

a first terminal of the second resistance unit is coupled to the second input terminal of the first operational amplifier, and a second terminal of the second resistance unit is connected to the ground signal.

6. The backlight control circuit according to claim 4, wherein the luminous flux sensing sub-circuit further includes an integrator; a first input terminal of the integrator is coupled to an output terminal of the subtractor, a second terminal of the integrator is connected to a ground signal, and an output terminal of the integrator is coupled to the first control signal output terminal.

7. The backlight control circuit according to claim 6, wherein the integrator includes: a second operational amplifier, a third resistance unit, a fourth resistance unit and a capacitance unit;

a first terminal of the third resistance unit is coupled to the output terminal of the subtractor, and a second terminal of the third resistance unit is coupled to the first input terminal of the second operational amplifier;

a first terminal of the fourth resistance unit is connected to the ground signal, and a second terminal of the fourth resistance unit is coupled to the second input terminal of the second operational amplifier;

a first terminal of the capacitor unit is coupled to the first input terminal of the second operational amplifier, and a second terminal of the capacitor unit is coupled to the output terminal of the second operational amplifier;

the output terminal of the second operational amplifier is coupled to the first control signal output terminal.

8. The backlight control circuit according to claim 7, wherein the luminous flux sensing sub-circuit further comprises:

a control reset unit, wherein the control reset unit is respectively coupled to a third signal terminal, the first terminal of the capacitance unit and the second terminal of the capacitance unit, and the control reset unit is configured to control to connect or disconnect the first terminal of the capacitance unit and the second terminal of the capacitance unit under the control of a signal inputted by the third signal terminal.

9. The backlight control circuit according to claim 6, wherein the luminous flux sensing sub-circuit further comprises:

an inverting operational amplifier, wherein a non-inverting input terminal of the inverting operational amplifier is connected to the ground signal, an inverting input terminal of the inverting operational amplifier is coupled to the output terminal of the integrator, an output terminal of the inverting operational amplifier is coupled to the first control signal output terminal.

10. A control method of a backlight control circuit, applied to the backlight control circuit according to claim 1, wherein the control method includes:

in an obtaining phase, sensing, by the luminous flux sensing sub-circuit, the luminous flux received by the display device in the environment thereof, obtaining the first control signal related to the luminous flux, and outputting the first control signal from the first control signal output terminal of the luminous flux sensing sub-circuit; providing, by the N second control signal output terminals corresponding to the N second sub-units, effective second control signals in a time division manner, and the effective second control signal being used to control a corresponding second sub-unit to connect the signal input terminal and the output terminal of the second sub-unit; when the corresponding relationship between the first control signal and the conduction threshold of the first sub-unit is met, connecting, by the first sub-unit, the output terminal of the second sub-unit and the backlight control signal output terminal.

11. The control method according to claim 10, wherein the first sub-unit includes a first transistor, the second sub-unit includes a second transistor, and a gate electrode of the first transistor is coupled to the first control signal output terminal, a first electrode of the first transistor is coupled to a second electrode of the second transistor, and a second electrode of the first transistor is coupled to the backlight control signal output terminal; a gate electrode of the second transistor is coupled to the corresponding second control signal output terminal, and a first electrode of the second transistor is coupled to the signal input terminal;

in the obtaining phase, the effective second control signal being used to control the corresponding second transistor to be turned on; when the corresponding relationship between the first control signal and the conduction threshold of the first transistor is met, the first transistor being turned on.

12. A display device, comprising the backlight control circuit according to claim 1, wherein the display device further comprises: a backlight driving circuit and a backlight source coupled to each other; wherein the backlight driving circuit is further coupled to a backlight control signal output terminal, and the backlight driving circuit is configured to output a backlight driving signal to the backlight source under the control of a backlight control signal outputted by the backlight control signal output terminal.

13. The display device according to claim 12, wherein, the first sub-unit includes a first transistor, a gate electrode of the first transistor is coupled to the first control signal output terminal, a first electrode of the first transistor is coupled to the output terminal of the second sub-unit, and a second electrode of the first transistor is coupled to the backlight control signal output terminal.

14. The display device according to claim 12, wherein, the second sub-unit includes a second transistor, a gate electrode of the second transistor is coupled to the corresponding second control signal output terminal, and a first electrode of the second transistor is connected to the signal input terminal, and a second electrode of the second transistor serves as the output terminal of the second sub-unit.

15. The display device according to claim 12, wherein the luminous flux sensing sub-circuit includes: a first photosensitive transistor, a second photosensitive transistor, a subtractor and a light-shielding pattern;

the light-shielding pattern shields the second photosensitive transistor;

both a gate electrode of the first photosensitive transistor and a gate electrode of the second photosensitive transistor are coupled to the first signal terminal, and a first electrode of the first photosensitive transistor and a first electrode of the second photosensitive transistor both are coupled to the second signal terminal, a second electrode of the first photosensitive transistor is coupled to a first input terminal of the subtractor, and a second electrode of the second photosensitive transistor is coupled to a second input terminal of the subtractor, and an output terminal of the subtractor is coupled to the first control signal output terminal.

16. The display device according to claim 15, wherein the subtractor includes: a first operational amplifier, a first resistance unit and a second resistance unit;

a first input terminal of the first operational amplifier is coupled to the second electrode of the first photosensitive transistor, and a second input terminal of the first operational amplifier is coupled to the second electrode of the second photosensitive transistor, an output terminal of the first operational amplifier is coupled to the first control signal output terminal;

a first terminal of the first resistance unit is coupled to the first input terminal of the first operational amplifier, and a second terminal of the first resistance unit is connected to a ground signal;

a first terminal of the second resistance unit is coupled to the second input terminal of the first operational amplifier, and a second terminal of the second resistance unit is connected to the ground signal.

17. The display device according to claim 15, wherein the luminous flux sensing sub-circuit further includes an integrator; a first input terminal of the integrator is coupled to an output terminal of the subtractor, a second terminal of the integrator is connected to a ground signal, and an output terminal of the integrator is coupled to the first control signal output terminal.

18. The display device according to claim 17, wherein the integrator includes: a second operational amplifier, a third resistance unit, a fourth resistance unit and a capacitance unit;

a first terminal of the third resistance unit is coupled to the output terminal of the subtractor, and a second terminal of the third resistance unit is coupled to the first input terminal of the second operational amplifier;

a first terminal of the fourth resistance unit is connected to the ground signal, and a second terminal of the fourth resistance unit is coupled to the second input terminal of the second operational amplifier;

a first terminal of the capacitor unit is coupled to the first input terminal of the second operational amplifier, and a second terminal of the capacitor unit is coupled to the output terminal of the second operational amplifier;

the output terminal of the second operational amplifier is coupled to the first control signal output terminal.

19. The display device according to claim 18, wherein the luminous flux sensing sub-circuit further comprises:

a control reset unit, wherein the control reset unit is respectively coupled to a third signal terminal, the first terminal of the capacitance unit and the second terminal of the capacitance unit, and the control reset unit is configured to control to connect or disconnect the first terminal of the capacitance unit and the second terminal of the capacitance unit under the control of a signal inputted by the third signal terminal.

20. The display device according to claim 17, wherein the luminous flux sensing sub-circuit further comprises:

an inverting operational amplifier, wherein a non-inverting input terminal of the inverting operational amplifier is connected to the ground signal, an inverting input terminal of the inverting operational amplifier is coupled to the output terminal of the integrator, an output terminal of the inverting operational amplifier is coupled to the first control signal output terminal.

* * * * *